United States Patent
Murakami et al.

(10) Patent No.: US 8,671,774 B2
(45) Date of Patent: Mar. 18, 2014

(54) ULTRASONIC FLOW METER UNIT

(75) Inventors: Hirokuni Murakami, Nara (JP); Yuji Fujii, Nara (JP); Masato Satou, Nara (JP)

(73) Assignee: Panasonic Corporation, Osaka (JP)

(*) Notice: Subject to any disclaimer, the term of this patent is extended or adjusted under 35 U.S.C. 154(b) by 194 days.

(21) Appl. No.: 13/499,257

(22) PCT Filed: Sep. 30, 2010

(86) PCT No.: PCT/JP2010/005899
§ 371 (c)(1),
(2), (4) Date: Mar. 29, 2012

(87) PCT Pub. No.: WO2011/040037
PCT Pub. Date: Apr. 7, 2011

(65) Prior Publication Data
US 2012/0186350 A1   Jul. 26, 2012

(30) Foreign Application Priority Data
Oct. 1, 2009   (JP) ................... 2009-229442

(51) Int. Cl.
G01F 1/20   (2006.01)
(52) U.S. Cl.
USPC ........................................ 73/861.18
(58) Field of Classification Search
USPC ............ 73/861.21, 861.25, 861.27–861.29, 73/861.18; 702/48
See application file for complete search history.

(56) References Cited

U.S. PATENT DOCUMENTS

| | | | | |
|---|---|---|---|---|
| 4,484,478 A | * | 11/1984 | Harkonen | 73/861.06 |
| 5,280,728 A | * | 1/1994 | Sato et al. | 73/861.28 |
| 7,201,065 B1 | * | 4/2007 | Feller | 73/861.27 |
| 7,628,081 B1 | * | 12/2009 | Feller | 73/861.27 |
| 8,347,734 B2 | * | 1/2013 | Berger et al. | 73/861.28 |
| 2006/0241474 A1 | | 10/2006 | Kawashima et al. | |
| 2007/0220995 A1 | * | 9/2007 | Kishiro et al. | 73/861.28 |
| 2012/0191382 A1 | * | 7/2012 | Nakabayashi et al. | 702/48 |
| 2013/0061686 A1 | * | 3/2013 | Fujii et al. | 73/861.21 |
| 2013/0167655 A1 | * | 7/2013 | Fujii et al. | 73/861.27 |

FOREIGN PATENT DOCUMENTS

| | | |
|---|---|---|
| JP | 62-128382 U | 8/1987 |
| JP | 2003-097993 A | 4/2003 |
| JP | 2003-302387 A | 10/2003 |
| JP | 2004-257738 A | 9/2004 |
| JP | 2006-279567 A | 10/2006 |
| JP | 2008-227658 A | 9/2008 |

OTHER PUBLICATIONS

International Search Report for International Application No. PCT/JP2010/005899, dated Dec. 7, 2010, 2 pages.

* cited by examiner

*Primary Examiner* — Jewel V Thompson
(74) *Attorney, Agent, or Firm* — Brinks Gilson & Lione

(57) ABSTRACT

The present invention provides an ultrasonic flow meter unit which can eliminate design factors associated with measuring performance, and improve general versatility and diversity. An ultrasonic flow meter unit of the present invention comprises a measurement fluid passage through which a fluid flows; a pair of ultrasonic transducers provided on the measurement fluid passage; and a measuring circuit board which measures a propagation time of an ultrasonic signal transmitted and received between the ultrasonic transducers, and calculates a fluid flow, lead pins bent with a predetermined angle are connected to terminals of the ultrasonic transducers, and the measuring circuit board is on-board mounted to the measurement fluid passage, and then the lead pins are connected to the measuring circuit board.

5 Claims, 7 Drawing Sheets

8  UNIT BODY
9  MEASUREMENT FLUID PASSAGE
10a ULTRASONIC TRANSDUCER
10b ULTRASONIC TRANSDUCER
14  LEAD PIN
12  MEASURING CIRCUIT BOARD
13  BOARD HOLDER
19  ULTRASONIC FLOW METER UNIT

8  UNIT BODY
9  MEASUREMENT FLUID PASSAGE
10a  ULTRASONIC TRANSDUCER
10b  ULTRASONIC TRANSDUCER
14  LEAD PIN
12  MEASURING CIRCUIT BOARD
13  BOARD HOLDER
19  ULTRASONIC FLOW METER UNIT

24 INSULATING PLATE
25 BOARD HOLDER
26 ULTRASONIC FLOW METER UNIT

ULTRASONIC FLOW METER UNIT

This application is a 371 application of PCT/JP2010/005899 having an international application date of Sep. 30, 2010, which claims priority to JP2009-229442 filed Oct. 1, 2009, the entire contents of which are incorporated herein by reference.

TECHNICAL FIELD

The present invention relates to an ultrasonic flow meter unit which measures a fluid such as gas or air using an ultrasonic sound wave.

BACKGROUND ART

Conventionally, in this type of ultrasonic flow meter, a pair of ultrasonic transducers are provided on a measurement fluid passage to face each other, and a fluid flow is measured based on a propagation time between the ultrasonic transducers. A measurement fluid passage section attached with the ultrasonic transducers is connected to an ultrasonic measuring circuit section which measures a propagation time and calculates a fluid flow via lead lines (see e.g., Patent Literature 1).

In another example, a measurement fluid passage is constructed as a unit in such a manner that ultrasonic transducers mounted to a measurement fluid passage section is tightly sealed (see e.g., Patent Literature 2).

FIG. 7 shows a conventional flow meter device disclosed in Patent Literature 1. As shown in FIG. 7, this flow meter device includes a measurement fluid passage 3 provided inside a gas chamber 1 via a separating wall 2 separating an inlet 1a and an outlet 1b from each other, ultrasonic transducers 4 and 5 provided to face other to sandwich the measurement fluid passage 3, a controller 6 provided outside the gas chamber 1, and lead lines 7 coupling the ultrasonic transducers 4 and 5 to the controller 6.

Patent Literature 1: Japanese Laid-Open Patent Application Publication No. 2003-97993
Patent Literature 2: Japanese Laid-Open Patent Application Publication No. 2008-227658

SUMMARY OF THE INVENTION

Technical Problem

However, in the conventional configuration, since the ultrasonic transducers 4 and 5 mounted to the measurement fluid passage 3 are connected to the controller 6 via the lead lines 7, there are many design restrictions relating to measurement performance, such as a specification of the lead lines 7, wiring of the lead lines 7, mounting accuracy of the ultrasonic transducers 4 and 5, a wire noise proof of the lead lines 7, or achievement of accuracy of the measurement fluid passage 3, and many adjustment steps are necessary in assembling.

The present invention is directed to solving the problem associated with the prior art and an object of the present invention is to provide an ultrasonic flow meter unit which can attain stable measurement performance and improve design flexibility.

Solution to Problem

To solve the problem associated with the prior art, an ultrasonic flow meter unit of the present invention comprises a measurement fluid passage through which a fluid flows; a pair of ultrasonic transducers provided on the measurement fluid passage; a measuring circuit board including a measuring section for measuring a propagation time of an ultrasonic signal transmitted and received between the ultrasonic transducers, and a fluid flow calculating section for calculating a fluid flow based on a signal from the measuring section; a board holder for holding the measuring circuit board; and lead pins connected to terminals of the ultrasonic transducers; wherein the board holder is on-board mounted to the measurement fluid passage, and then the lead pins are connected to the measuring circuit board.

In this configuration, it is possible to eliminate design matter restrictions associated with measuring performance, such as mounting accuracy of the ultrasonic transducers, wire noise proof of extended lead lines, or accuracy of the measurement fluid passage.

The above and further objects, features and advantages of the present invention will more fully be apparent from the following detailed description of preferred embodiments with accompanying drawings.

Advantageous Effects of the Invention

As should be appreciated from the above, the present invention achieves an advantage that it is possible to attain an ultrasonic flow meter unit which can stabilize measuring performance and improve design flexibility.

DETAILED DESCRIPTION OF THE PREFERRED EMBODIMENTS

Figure 1:
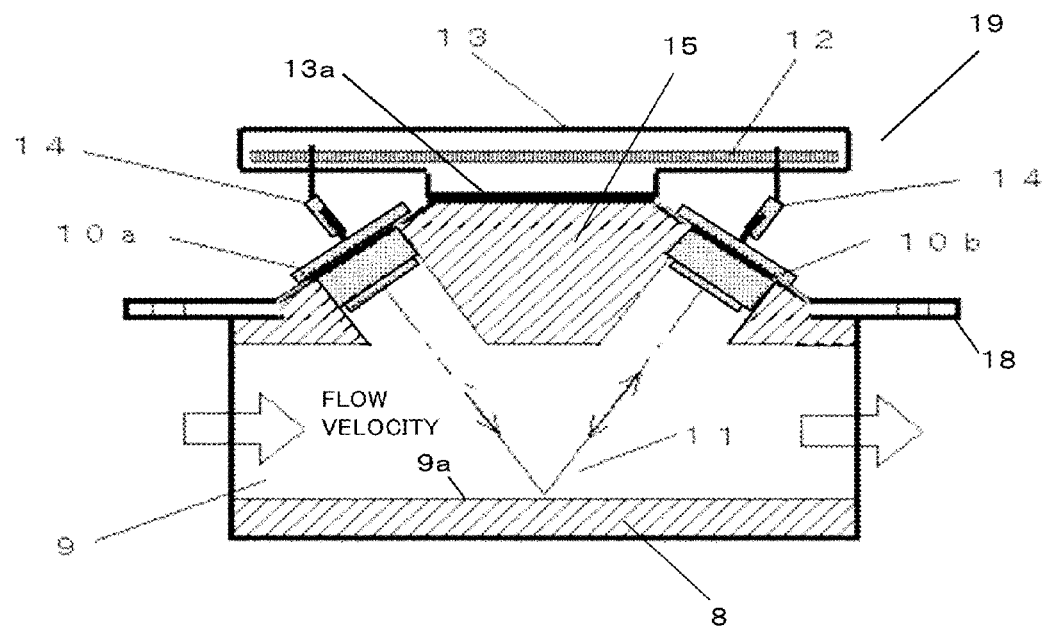
FIG. 1 is a cross-sectional view showing an exemplary configuration of an ultrasonic flow meter unit according to Embodiment 1 of the present invention.

According to the present invention, an ultrasonic flow meter unit comprises a measurement fluid passage through which a fluid flows; a pair of ultrasonic transducers provided on the measurement fluid passage; a measuring circuit board including a measuring section for measuring a propagation time of an ultrasonic signal transmitted and received between the ultrasonic transducers, and a fluid flow calculating section for calculating a fluid flow based on a signal from the measuring section; a board holder for holding the measuring circuit board; and lead pins connected to terminals of the ultrasonic transducers; wherein the board holder is on-board mounted to the measurement fluid passage, and then the lead pins are connected to the measuring circuit board. In this configuration, it is possible to eliminate design matter restrictions associated with measuring performance, such as mounting accuracy of the ultrasonic transducers, wire noise proof of extended lead lines, or accuracy of a measurement fluid passage.

In the ultrasonic flow meter unit having the above configuration, the measuring circuit board may have a flat plate shape, and may be disposed in parallel with a fluid flow direction of the measurement fluid passage; the ultrasonic transducers may be disposed with an angle with respect to the fluid flow direction of the measurement fluid passage; and each of the lead pins may be bent such that its end connected to the measuring circuit board is perpendicular to the measuring circuit board and has a U-shaped lead forming in an intermediate portion thereof. This makes it possible to absorb a thermal distortion which would be generated in a configuration in which the ultrasonic transducers are directly connected to the measuring circuit board.

In the ultrasonic flow meter unit having the above configuration, the pair of ultrasonic transducers may be arranged on the same surface side of the measurement fluid passage such that an ultrasonic sound wave transmitted from one of the ultrasonic transducers is reflected once by an inner wall of the measurement fluid passage and is received by the other of the pair of ultrasonic transducers. In this configuration, since the ultrasonic transducers are arranged on one side of the measurement fluid passage, they can be connected to the measuring circuit board with a shortest distance. As a result, the size of the measuring circuit board can be made small.

In the ultrasonic flow meter unit having the above configuration, the board holder may be provided integrally with an insulating plate positioned between the lead pins. This makes it possible to ensure insulativity of the ultrasonic transducers between the lead pins.

In the ultrasonic flow meter unit having the above configuration, the board holder may be provided integrally with lead pin guides for guiding the lead pins into insertion holes provided on the measuring circuit board, respectively. This allows the lead pins to be inserted into the insertion holes of the measuring circuit board easily.

Hereinafter, embodiments of the present invention will be described with reference to the drawings. The embodiments below are in no way intended to limit the present invention.

Embodiment 1

FIG. 1 is a schematic cross-sectional view showing a configuration of an ultrasonic flow meter unit according to Embodiment 1 of the present invention.

As shown in FIG. 1, an ultrasonic flow meter unit 19 of the present embodiment comprises a unit body 8, ultrasonic transducers 10a and 10b, a measuring circuit board (substrate) 12, a board (substrate) holder 13, a mounting flange 18, etc.

The ultrasonic transducers 10a and 10b are mounted to the unit body 8 and are placed on the same surface of the measurement fluid passage 9 so that an ultrasonic sound wave transmitted from one of the ultrasonic transducers 10a and 10b is reflected once by a wall surface 9a of the measurement fluid passage 9 and is received by the other of the ultrasonic transducers 10a and 10b. To be specific, the ultrasonic transducer 10a is positioned at a downstream side in a flow direction (see block arrows) of a fluid in the measurement fluid passage 9, while the ultrasonic transducer 10b is positioned at an upstream side in the flow direction. The ultrasonic transducer 10a is inclined such that a transmission/reception surface of the ultrasonic sound wave is directed in an upward direction with respect to the flow direction (see block arrows) of the fluid in the measurement fluid passage 9. The ultrasonic transducer 10b is inclined such that a transmission/reception surface of the ultrasonic sound wave is directed in a downstream direction with respect to the flow direction of the fluid. Therefore, an ultrasonic signal 11 transmitted from the ultrasonic transducer 10a (or ultrasonic transducer 10b) is reflected by the wall surface 9a, and is received by the ultrasonic transducer 10b (or ultrasonic transducer 10a).

The measuring circuit board 12 includes a measuring section (not shown) for measuring a propagation time of transmission/reception of the ultrasonic sound wave between the ultrasonic transducers 10a and 10b, and a fluid flow calculating section for calculating a fluid flow based on a signal from the measurement section. The measuring circuit board 12 is built into the board holder 13. The board holder 13 is mounted to the unit body 8 by a joint portion 13a. The joint portion 13a is a part of the outer surface of the unit body 8, and is located between mount positions of the pair of ultrasonic transducers 10a and 10b. The joint portion 13a is a substantially flat surface. Because of this, the measuring circuit board 12 mounted via the board holder 13 is placed in parallel with the direction in which the fluid passage is placed in the interior of the measurement fluid passage 9 (i.e., flow direction of the fluid). The lead pins 14 connected to the terminals of each of the ultrasonic transducers 10a and 10b are solder-mounted to the measuring circuit board 12. This allows the ultrasonic transducers 10a and 10b to be electrically connected to the measuring circuit board 12.

The unit body 8 includes the measurement fluid passage 9 inside thereof, and a convex-shaped transducer mounting section 15 on an outer surface thereof. The transducer mounting section 15 has a trapezoidal cross-section. An upper surface of the transducer mounting section 15 is the joint portion 13a, and inclined surfaces corresponding to oblique sides of the trapezoidal shape have a pair of inclined holes by which the ultrasonic transducers 10a and 10b are mounted to the unit body 8, respectively. These inclined holes are inclined in a direction from outside to inside of the measurement fluid passage 9 to face each other. As described above, between the inclined holes, the joint portion 13a being substantially flat is provided. In addition, the mounting flange 18 is provided outward relative to the transducer mounting section 15 (i.e., outward relative to the ultrasonic transducers 10a and 10b). The transducer mounting section 15 and the mounting flange 18 will be described later.

The specific configuration of the unit body 8, the measurement fluid passage 9, the ultrasonic transducers 10a and 10b, the measuring circuit board 12, the board holder 13, the mounting flange 18, and the like, are not particularly limited, but known components may be used. In addition, the inclination angles of the ultrasonic transducers 10a and 10b (i.e., the inclination angles of the pair of inclined holes provided on the unit body 8) are not particularly limited. The inclination angles of the ultrasonic transducers 10a and 10b may be such that the ultrasonic signal 11 can be transmitted and received by reflection by the wall surface 9a between the ultrasonic transducers 10a and 10b mounted to the unit body 8, in view of the inner diameter of the measurement fluid passage 9 or the length of the unit body 8.

Figure 2A:
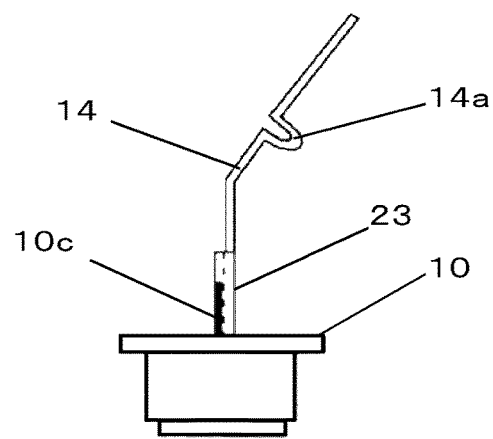
FIG. 2A is a side view showing an exemplary configuration of an ultrasonic transducer included in the ultrasonic flow meter unit of FIG. 1.
Figure 2B:
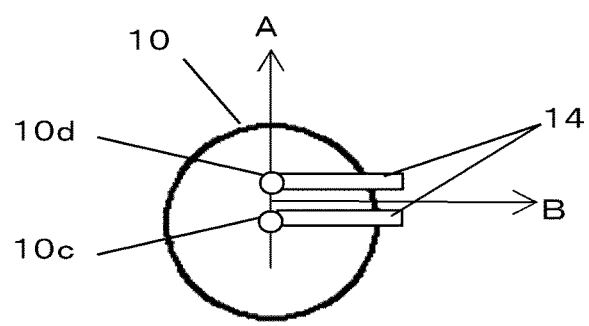
FIG. 2B is a plan view of the ultrasonic transducer of FIG. 2A.

FIGS. 2A and 2B show a configuration of the terminals of the ultrasonic transducer 10a or 10b and the lead pins 14 connected to the terminals, respectively, in the ultrasonic flow meter unit 19 of FIG. 1. Since the ultrasonic transducers 10a and 10b fundamentally have the same configuration, they will be collectively referred to as "ultrasonic transducer 10", hereinafter.

As shown in FIG. 2A, one end of each of the lead pins 14 is connected to a surface of the ultrasonic transducer 10 which is on an opposite side of the transmission/reception surface of the ultrasonic transducer 10. The other end of each of the lead pins 14 is a connecting end connected to the measuring circuit board 12. The other end of each of the lead pins 14 is bent with an angle so as to extend in a direction perpendicular to the measuring circuit board 12 mounted to the unit body 8 in a state where the ultrasonic transducer 10 is mounted to the unit body 8. The lead pins 14 are connected to the terminal 10c (and terminal 10d) of the ultrasonic transducer 10 by swage 23 (or welding). Each of the lead pins 14 is provided with a U-shaped lead forming 14a.

As shown in FIG. 2B, the lead pins 14 are attached to the ultrasonic transducer 10 such that the lead pins 14 are bent in an orthogonal direction B with respect to an arrangement direction A of the terminals 10c and 10d of the ultrasonic transducer 10. The specific configuration of the lead pins 14 is not particularly limited but may be a known configuration. The lead pins 14 are bent with an angle set as described above. The length of the lead pins 14 may be suitably designed to allow the lead pins 14 to be solder-mounted to the measuring circuit board 12.

Figure 3:
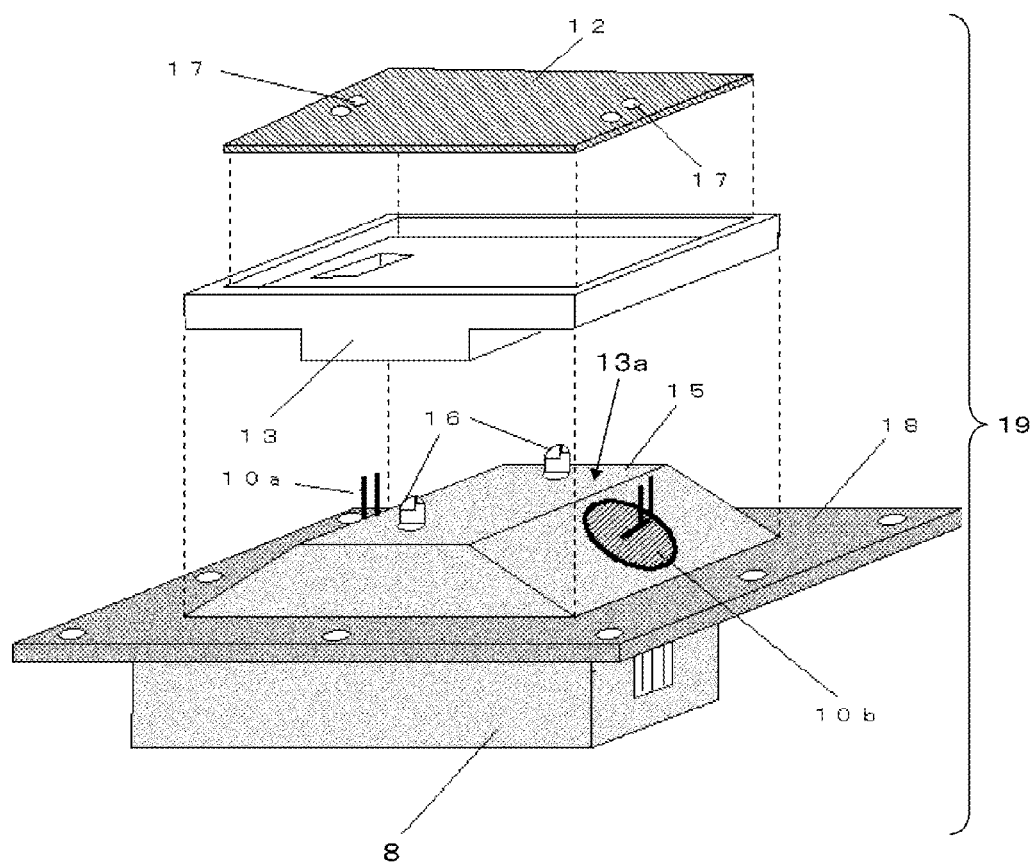
FIG. 3 is a perspective view showing an exemplary configuration of the ultrasonic flow meter unit of FIG. 1 in assembling.

FIG. 3 is a perspective view schematically showing a configuration of the ultrasonic flow meter unit 19 of FIG. 1 in assembling. In FIG. 3, the unit body 8, the board holder 13, and the measuring circuit board 12 are connected together by dotted lines, to show the configuration in assembling.

As shown in FIG. 3, initially, the ultrasonic transducers 10a and 10b are mounted to the inclined holes of the transducer mounting section 15 of the unit body 8 (including the measurement fluid passage 9 inside thereof) in a sealed state (not shown). Then, the board holder 13 incorporating the measuring circuit board 12 is fastened to the joint portion 13a (upper surface of the transducer mounting section 15) of the unit body 8. The joint portion 13a is provided with retaining protrusions 16. The board holder 13 is fastened to the joint portion 13a (i.e., unit body 8) via the retaining protrusions 16. The lead pins 14 are inserted into terminal holes 17 of the measuring circuit board 12 and solder-mounted thereto. The mounting flange 18 is provided to enclose the transducer mounting section 15 of the unit body 8. In this way, the ultrasonic flow meter unit 19 is assembled.

The feature of the ultrasonic flow meter unit 19 configured as described above will be discussed hereinafter.

By merely introducing a fluid which is a measurement target into an inlet of the measurement fluid passage 9, ultrasonic fluid flow measurement is implemented. In the present embodiment, the ultrasonic flow meter unit 19 has the following configuration. (i) The ultrasonic transducers 10a and 10b are placed on the unit body 8 (on the same surface of the measurement fluid passage 9) to allow the ultrasonic signal 11 to be reflected once by the wall surface 9a of the measurement fluid passage 9 and to be transmitted and received between the ultrasonic transducers 10a and 10b. (ii) The measuring circuit board 12 (including a measuring section for measuring a propagation time for which the ultrasonic signal 11 is transmitted and received between the ultrasonic transducers 10a and 10b, and a fluid flow calculating section for calculating a fluid flow based on a signal from the measuring section) is joined to the unit body 8 (i.e., measurement fluid passage 9) along with the board holder 13. (iii) The terminals of the ultrasonic transducers 10a and 10b are connected to the measuring circuit board 12 via the lead pins 14. Therefore, an influence of the lead lines for mounting the ultrasonic transducers 10 to the unit body 8 can be lessened, and the ultrasonic flow meter unit 19 can accommodate design factors associated with accuracy of the measurement fluid passage 9 and measurement performance. In addition, adjustment of accuracy in assembling can be made together. Because of these, the size of the ultrasonic flow meter unit 19 can be reduced, and its productivity can be improved, as compared to the conventional ultrasonic flow meter unit.

Figure 4:
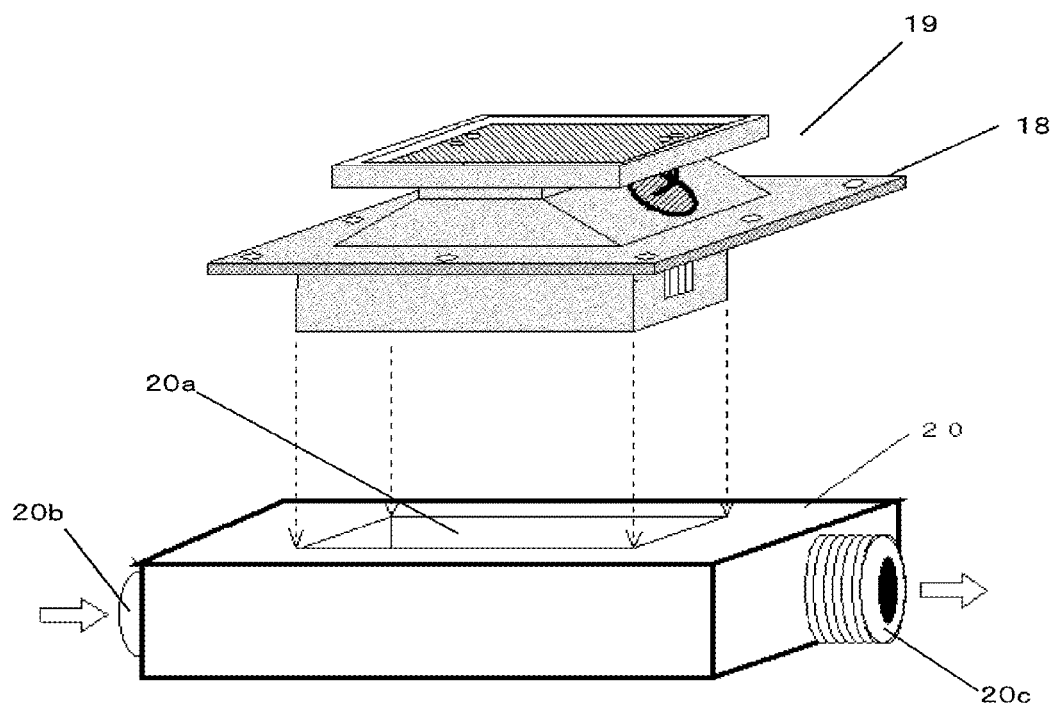
FIG. 4 is a perspective view showing a mounting configuration of a flow meter device using the ultrasonic flow meter unit of FIG. 1.

FIG. 4 shows an application example in a case where the ultrasonic flow meter unit 19 of the present invention is applied to a flow meter device.

As shown in FIG. 4, since the ultrasonic flow meter unit 19 is provided with the mounting flange 18 with which the ultrasonic flow meter unit 19 is mounted to a gas passage 20, it can be fitted into an insertion section 20a of the gas passage 20 and fastened thereto. The gas passage 20 is constructed as a casing (gas passage casing) so that the gas flows into the gas passage 20 through an inlet 20b and is discharged from an outlet 20c. The insertion section 20a which is an opening is provided in the gas passage 20 to allow the ultrasonic flow meter unit 19 of the present invention to be mounted to the gas passage 20.

Figure 5:
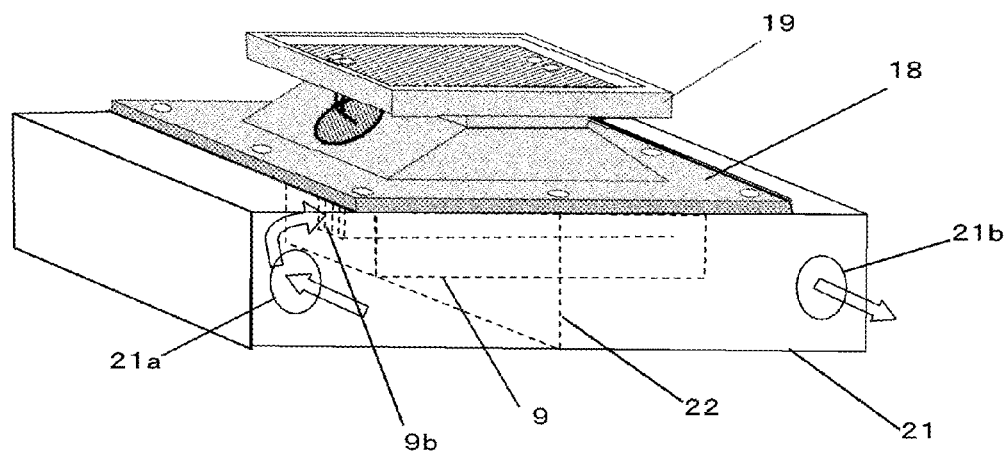
FIG. 5 is a perspective view showing another mounting configuration of the flow meter device using the ultrasonic flow meter unit of FIG. 1.

FIG. 5 shows another application example in a case where the ultrasonic flow meter unit 19 of the present invention is applied to a meter device.

As shown in FIG. 5, a flow meter device body 21 is provided with a wall 22 separating an inlet 21a and an outlet 21b of the gas from each other, between the inlet 21a and the outlet 21b of the gas. The ultrasonic flow meter unit 19 of the present invention can be fitted into the flow meter device body 21 such that the inlet 21a and the outlet 21b are connected together via the wall 22. In this case, the gas which is a measurement target flows into the flow meter device body 21 from the inlet 21a, and through an inflow inlet 9b of the measurement fluid passage 9 of the ultrasonic flow meter unit 19, and thereafter is discharged from the outlet 21b. The flow meter device body 21 has a simple structure in which the separating wall 2 defines the inlet 21a side and the outlet 21b side. Thereby, flexibility of the layout of the inlet and the outlet is improved. As a result, a small-sized and lightweight ultrasonic flow meter unit which is excellent in diversity and general versatility can be provided.

As should be appreciated from the above, in accordance with the ultrasonic flow meter unit 19 of the present embodiment, design factors and restrictions associated with ultrasonic flow measuring performance can be eliminated, and measuring accuracy, general versatility and diversity can be improved. Although in the present embodiment, in the examples shown in FIGS. 4 and 5, a measurement target whose flow is to be measured is the gas, the present invention is not limited to this. The flow of any kind of fluid can be measured so long as it is a fluid such as liquid.

Embodiment 2

Figure 6A:
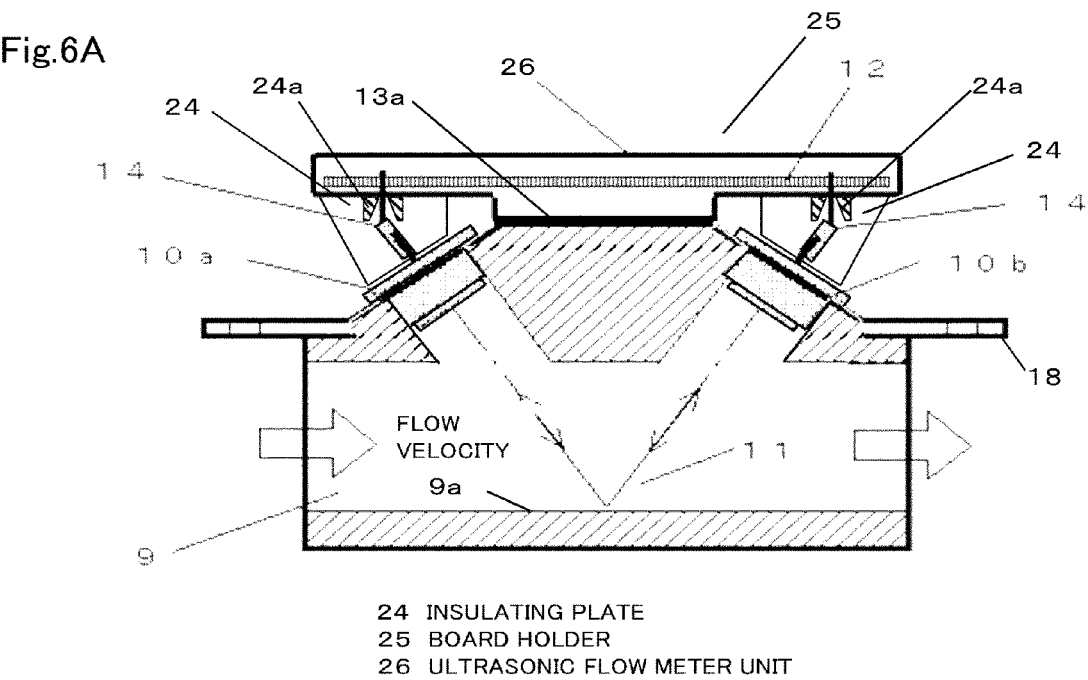
FIG. 6A is a cross-sectional view showing an exemplary configuration of an ultrasonic flow meter unit according to Embodiment 2 of the present invention.
Figure 6B:
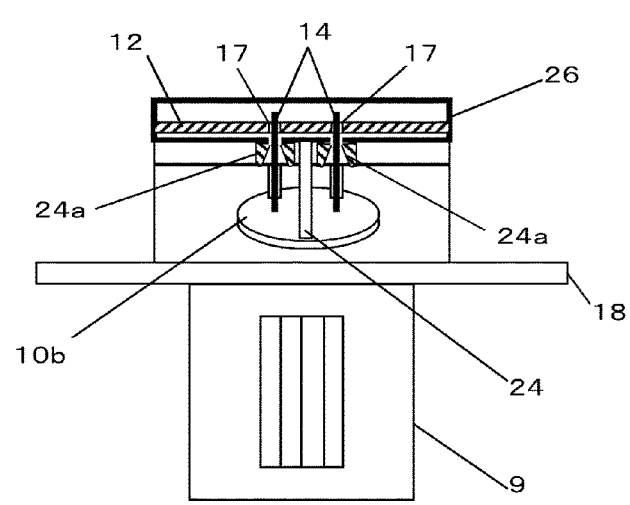
FIG. 6B is a side view of the ultrasonic flow meter unit of FIG. 6A.
Figure 7:
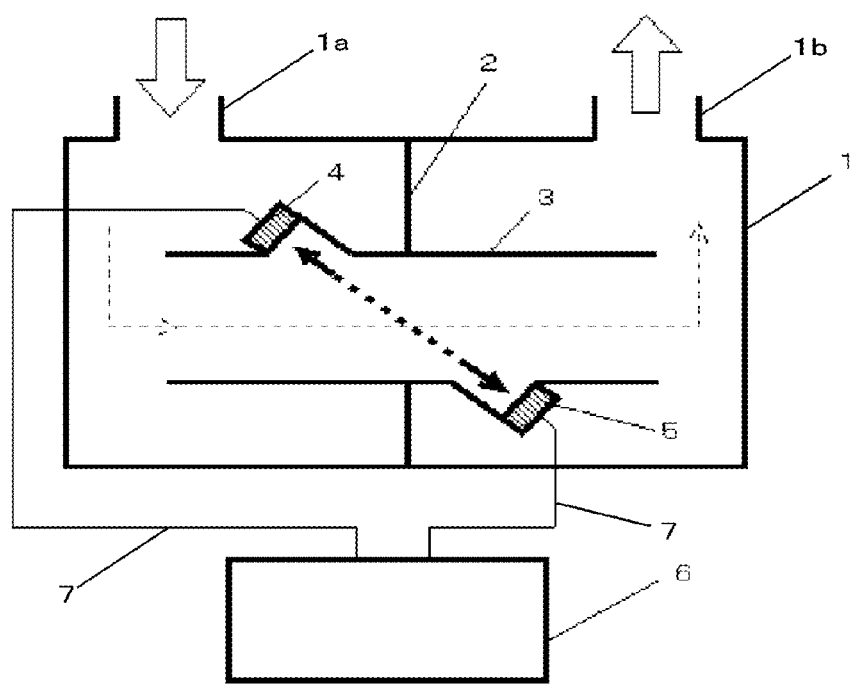
FIG. 7 is a schematic cross-sectional view showing an exemplary configuration of a conventional ultrasonic gas meter.

FIGS. 6A and 6B show Embodiment 2 of the present invention. In Embodiment 2, the same components as those of Embodiment 1 or the corresponding components are designated by the same reference symbols and repetitive description will be omitted. In FIGS. 6A and 6B, no reference symbols are assigned to some of the components for the sake of easier explanation.

As shown in schematic cross-sectional view of FIG. 6A, an ultrasonic flow meter unit 25 of the present embodiment has a configuration in which insulating plates 24 and lead pin guides 24a are provided on surfaces of the board holder 26 which are connected with the ultrasonic transducers 10a and 10b.

To be specific, as shown in the side view of FIG. 6B (the board holder 26 and the measuring circuit board 12 are shown in cross-section), the insulating plate 24 is provided integrally with the board holder 26 between two lead pins 14 (see FIG. 2B) connected to the ultrasonic transducer 10a, 10b, to provide insulativity between the lead pins 14. The lead pin guides 24a are provided around terminals holes 17 provided on the measuring circuit board 12 to guide the lead pins 14 into the terminal holes 17 therethrough.

In accordance with this configuration, in a case where the board holder 26 is manufactured using resin, the insulating plate 24 and the lead pin guides 24a can be formed together. Therefore, without increasing cost, insulativity between the lead pins 14 in the ultrasonic transducer 10b can be ensured, and the lead pins 14 can be inserted easily into the terminal holes 17 of the measuring circuit board 12.

The specific configuration of the insulating plate 24 and the lead pin guides 24a is not particularly limited. In the present embodiment, as shown in FIGS. 6A and 6B, the insulating plate 24 and the lead pin guides 24a are provided integrally with the board holder 26. Alternately, they may be provided separately from the board holder 26 and attached to it. Suitable values are set as the thickness of the insulating plate 24, protruding length of the lead pin guides 24a, and other dimensions, according to conditions.

As should be appreciated from the above, in accordance with the ultrasonic flow meter unit 25 of the present embodiment, design factors and restrictions associated with ultrasonic flow measuring performance can be eliminated, and measuring accuracy, general versatility and diversity can be improved.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

As described above, an ultrasonic flow meter unit of the present invention can eliminate design factors and restrictions associated with ultrasonic flow measuring performance, and improve measuring accuracy, general versatility and diversity. Therefore, the ultrasonic flow meter unit is widely suitably used as gas meters or gas measuring devices in factories, measuring devices of various fluids, etc.

The invention claimed is:

1. An ultrasonic flow meter unit comprising:
   a measurement fluid passage through which a fluid flows;
   a pair of ultrasonic transducers provided on the measurement fluid passage;
   a measuring circuit board including a measuring section for measuring a propagation time of an ultrasonic signal transmitted and received between the ultrasonic transducers, and a fluid flow calculating section for calculating a fluid flow based on a signal from the measuring section;
   a board holder for holding the measuring circuit board; and
   lead pins connected to terminals of the ultrasonic transducers;
   wherein the board holder is on-board mounted to the measurement fluid passage, and then the lead pins are connected to the measuring circuit board.

2. The ultrasonic flow meter unit according to claim 1, wherein the measuring circuit board has a flat plate shape, and is disposed in parallel with a fluid flow direction of the measurement fluid passage;
   the ultrasonic transducers are disposed with an angle with respect to the fluid flow direction of the measurement fluid passage; and
   each of the lead pins is bent such that its end connected to the measuring circuit board is perpendicular to the measuring circuit board and has a U-shaped lead forming in an intermediate portion thereof.

3. The ultrasonic flow meter unit according to claim 1, wherein the pair of ultrasonic transducers are placed on the same surface side of the measurement fluid passage such that an ultrasonic sound wave transmitted from one of the ultrasonic transducers is reflected once by an inner wall of the measurement fluid passage and is received by the other of the pair of ultrasonic transducers.

4. The ultrasonic flow meter unit according to claim 1, wherein the board holder is provided integrally with an insulating plate positioned between the lead pins.

5. The ultrasonic flow meter unit according to claim 1, wherein the board holder is provided integrally with lead pin guides for guiding the lead pins into insertion holes provided on the measuring circuit board, respectively.

* * * * *